Patented May 5, 1931

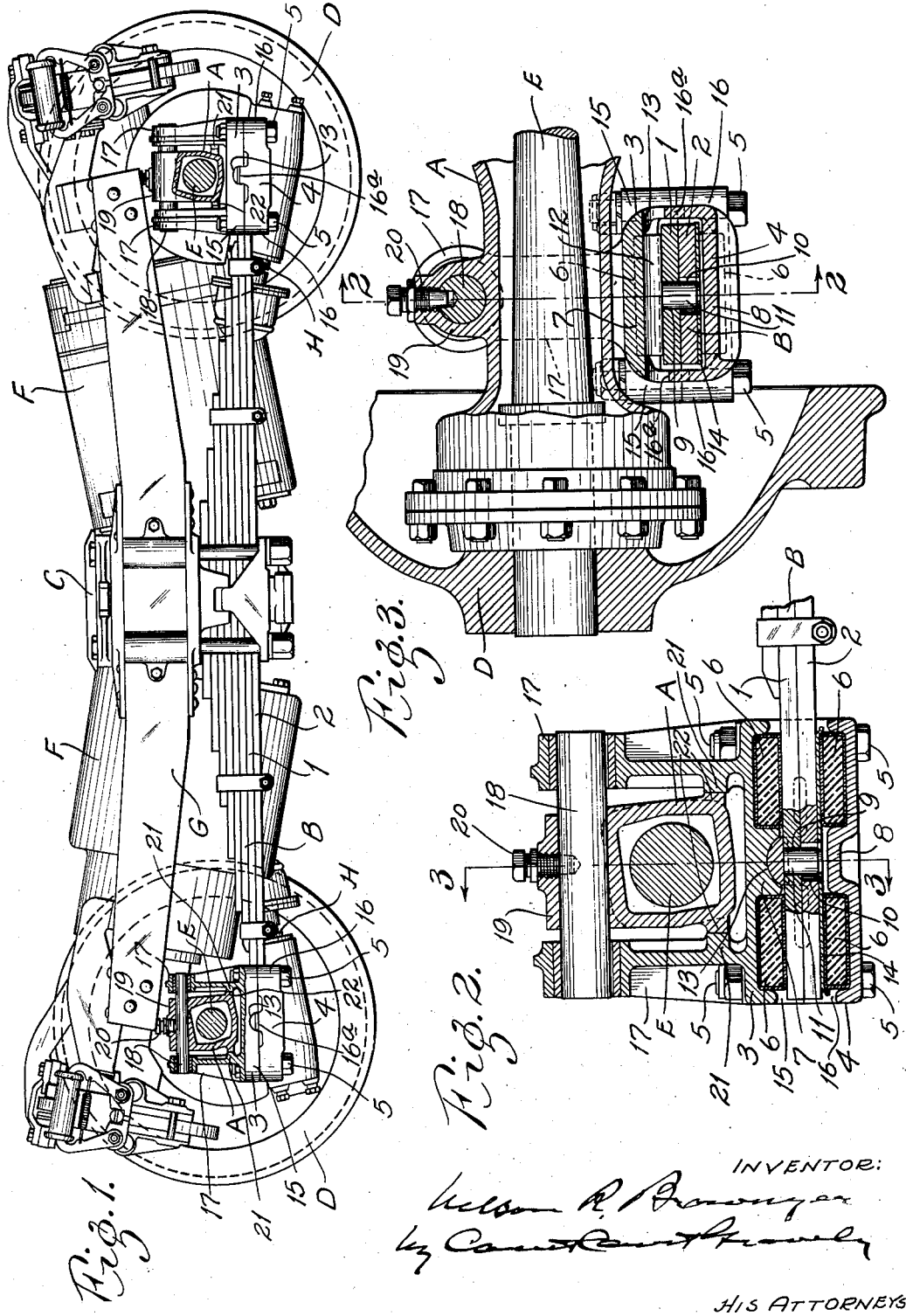

1,803,594

UNITED STATES PATENT OFFICE

NELSON R. BROWNYER, OF DETROIT, MICHIGAN, ASSIGNOR TO THE TIMKEN-DETROIT AXLE COMPANY, OF DETROIT, MICHIGAN, A CORPORATION OF OHIO

CAR TRUCK

Application filed March 21, 1930. Serial No. 437,771.

This invention relates to vehicles trucks, and more particularly to street car trucks of the kind having two motor driven axles enclosed in load supporting axle housings that are connected together at their corresponding ends by side springs. The principal object of the present invention is to provide for relative movement of the axle housings and side springs transversely of the truck, thereby preventing the transmission of destructive lateral blows and shocks between the truck frame and axle housings. Other objects are simplicity and cheapness of construction and compactness of design. The invention consists in the truck, and in the construction, combinations and arrangements of parts hereinafter described and claimed.

In the accompanying drawing, which forms part of the specification and wherein like symbols refer to like parts wherever they occur, Fig. 1 is a vertical longitudinal section through a truck embodying my invention, the section being taken through the driving axles between the wheels and the side springs on the near side of the truck, Fig. 2 is an enlarged transverse section through one of the axle housings at one of the spring seats, the section being taken on the line 2—2 in Fig. 3; and Fig. 3 is a vertical section on the line 3—3 in Fig. 2.

Referring to the accompanying drawing, my invention is shown in connection with an electric car truck comprising two axle housings A, semi-elliptic longitudinal side springs B connecting the ends of said axle housings, and a suitable truck bolster C connecting said side springs about midway of their length. Rail wheels D are suitably secured to axle shaft sections E rotatably mounted in the axle housings A and operatively connected by differential mechanisms (not shown) interposed between them. The axle shaft sections E of the two differential driving axles are preferably driven by means of electric motors F mounted in a frame G located above the axle housings A and the longitudinal side springs B which connect them together. The side rails of the motor supporting frame G are secured intermediate their ends to the ends of the truck bolster C. The two driving motors are preferably arranged on opposite sides of the truck bolster C; and each motor is operatively connected to drive the axle more distant from it by means of a propeller shaft H having universal joint connections with the armature shaft of the motor and the worm propeller shaft of the driving axle. The electric car truck thus far described is fully shown and described in Alden and Brownyer Patent No. 1,748,747, dated February 25, 1930, to which reference is made in lieu of further description.

Each side spring B comprises a series of leaves superposed one upon the other, the two lower leaves 1 and 2 being long leaves of substantially the same length and the remaining leaves being regularly shortened or graduated from top to bottom. At each end of each side spring B the two long lower leaves 1 and 2 thereof extend beneath the end of the axle housing A located adjacent thereto and are suspended therefrom by means of a swing-hanger member comprising two cooperating spring seats 3 and 4 located one above and the other below the projecting ends of said leaves. The upper spring seat 3 is interposed between the upper leaf 1 and the bottom of the axle housing A; and the lower spring seat 4 fits under the lower leaf 2. The upper and lower spring seats 3 and 4 are secured together, with the ends of the two long lower leaves 2 and 3 of the spring B disposed therebetween, by means of four vertical bolts 5 which pass through alined apertures therefor in the four corners of said spring seats.

The spring opposing faces of the upper and lower spring seats 3 and 4 are provided on opposite sides of the longitudinal center line of the axle to which they are secured with recesses adapted to receive rectangular blocks 6 of rubber or other nonmetallic material. The two rubber blocks seated in the upper spring seat are separated by means of a cross member or bar 7 that extends from side to side of said spring seat crosswise of the side spring; and the lower spring seat 4 is likewise provided with a cross rib or bar 8 for separating the lower pair of blocks. Extending through a circular hole 9 in the upper leaf 1 and an elongated slot 10 in the lower leaf 2 at about the center of the spring seats is a dowel pin or stud 11. The dowel pin 11 is provided at its upper end with a laterally extending cross head 12 which fits within a longitudinal groove 13 in the underside of the cross bar 7 of the upper spring seat 3. The groove 13 has a transversely curved concave surface; and the cross bar or head 12 of the dowel pin 11 has a transversely curved convex upper surface adapted to fit the curved surface of said groove. The dowel pin 11 has a snug fit in the hole 9 in the upper leaf 1; and the slot 10 in the lower leaf 2 is elongated lengthwise of the spring to permit relative movement between said pin and said lower leaf longitudinally of the latter.

The rubber blocks 6 are preferably provided with a convex covering to prevent excessive flow of the rubber under load. A thin plate 14, preferably of brass, is interposed between the opposing surfaces of the lower leaf 2 and the lower pair of rubber supporting blocks for the purpose of permitting an easy sliding movement of said leaf relative to said blocks. The amount of compression applied to the rubber blocks when the bolts 5 are tightened is limited by abutting flanges 15 and 16 at the sides of the upper and lower spring seats 3 and 4, respectively. The side flanges 16 of the lower spring seat are provided with tongues 16a that fit within the ends of the groove 13 in the upper spring seat and thus serve to properly position the two seats with respect to each other.

The cooperating spring seats are suspended from the axle housing, for vertical swinging movement longitudinally thereof, by means of spaced hangers or arms 17 that project upwardly from the upper spring seat 3 on opposite sides of said axle housing and are provided at their upper ends with alined openings adapted to receive the ends of a horizontal pivot pin 18 disposed transversely of said housing. As shown in the drawing, the hangers 17 are rotatably supported on the pivot pin 18, which is mounted in a bore provided therefor in a boss 19 in the top of the axle housing, and is preferably held against both rotary and endwise movement therein by means of a set screw 20. For the purpose of taking the fore and aft thrust between the hanger arms 17 and the axle housing, the opposing side faces of said arms and said housing are provided with lugs 21 and 22, respectively, that are disposed in abutting relation.

The foregoing car truck has numerous advantages. The side springs serve to properly position the axles relative to each other and also resist driving and braking torque. The cushioning pads between the springs and spring seats permit the springs to flex; and they also serve to cushion the rail vibrations and thus deaden noise and minimize jarring and jolting. The dowel pins can oscillate in the upper spring seats as the rubber blocks distort slightly due to the torque strains on the axle housings and also when deflection occurs. The slot-and-pin connections between the dowel pins and the spring leaves 2 permit relative longitudinal sliding movement of said leaves with respect of the leaves 1 and spring seats; and they also permit tilting movement of the portions of said leaves located between the spring seats without bending said leaves where they enter said spring seats.

It is noted as an important advantage of the foregoing construction that it permits relative movement of the axle housings and side springs transversely of the truck, thereby preventing lateral blows and shocks from being communicated to the car body, and the momentum of the car body from acting with its full force on the truck frame and wheel flanges. As the axle moves laterally of the truck the spring seats are tilted, and thereby tend to twist the side springs from the end to the middle thereof; and said springs, in resisting such twisting action, tend to return the spring seats and the axles to their original positions with the spring hangers disposed vertically.

Obviously, the hereinbefore described construction admits of considerable modification without departing from the invention, and I do not wish to be limited to the precise construction shown and described.

What I claim is:

1. A vehicle truck comprising axle housings, members extending from axle housing to axle housing, a support for each end of each member, said support being located below the axle located adjacent thereto and having hanger arms that are rigid therewith and extend upwardly on opposite sides of said housing and are pivotally secured to the upper portion of said axle housing for vertical swinging movement laterally of said truck.

2. A vehicle truck comprising axle housings, leaf springs connecting the corresponding ends of said housings, spring seats located below said axle housings for supporting the ends of said springs, said spring seats being provided on opposite sides of said axle housings with upwardly extending hangers, and pivot pins supported on said housings and supporting said hanger arms for vertical swinging movement transversely of said truck.

3. A vehicle truck comprising axle housings, leaf springs connecting the corresponding ends of said housings, and a connection between each end of each spring and the adjacent end of an axle housing, said connection comprising upper and lower spring seats secured to each other and to said spring, the upper spring seat being pivotally secured to said axle housing for vertical swinging movement transversely of said truck.

4. A vehicle truck comprising axle housings, leaf springs connecting the corresponding ends of said housings, and a connection between each end of each spring and the adjacent end of an axle housing, said connection comprising upper and lower spring seats secured to each other and to said spring, the upper spring seat being provided with spaced hanger arms disposed on opposite sides of said axle housing, and means on said axle housing for supporting said hanger arms for vertical swinging movement transversely of said truck.

5. A vehicle truck comprising axle housings, leaf springs connecting the corresponding ends of said housings and a connection between each end of each spring and the adjacent end of an axle housing, said connection comprising upper and lower spring seats secured to each other and to said spring, the upper spring seat being provided with spaced hanger arms disposed on opposite sides of said axle housing, and a pivot pin mounted on said axle housing and supporting said hanger arms for vertical swinging movement transversely of said truck.

6. A vehicle truck comprising axle housings, leaf springs connecting the corresponding ends of said housings, and a connection between each end of each spring and the adjacent end of an axle housing, said connection comprising upper and lower spring seats secured to each other and to said spring below said axle housing, the upper spring seat being provided with upwardly extending hanger arms disposed on opposite sides of said axle housing in abutting relation thereto, and a pivot pin mounted on top of said axle housing for supporting said hanger arms for vertical swinging movement transversely of said truck.

7. A vehicle truck comprising axle housings, leaf springs connecting the corresponding ends of said housings, and a connection between each end of each spring and the adjacent end of an axle housing, said connection comprising upper and lower spring seats secured to each other and to said spring below said axle housing, nonmetallic cushioning blocks mounted in said spring seats above and below said spring, the upper spring seat being provided with upwardly extending hanger arms disposed on opposite sides of said housing in abutting relation thereto, and a pivot pin mounted on top of said housing transversely thereto for supporting said hanger arms for vertical swinging movement transversely of said truck.

Signed at Detroit, Michigan, this 18th day of March, 1930.

NELSON R. BROWNYER.